United States Patent
Coureau et al.

(10) Patent No.: US 11,290,877 B2
(45) Date of Patent: Mar. 29, 2022

(54) METHOD AND DEVICE FOR THE DUAL-CONTROL SET UP OF A CONFIGURATION RULE OF AN EMBEDDED SIM CARD

(71) Applicant: ORANGE, Issy-les-Moulineaux (FR)

(72) Inventors: Laurent Coureau, Morangis (FR); Said Gharout, Paris (FR)

(73) Assignee: ORANGE, Issy-les-Moulineaux (FR)

( * ) Notice: Subject to any disclaimer, the term of this patent is extended or adjusted under 35 U.S.C. 154(b) by 362 days.

(21) Appl. No.: 16/300,286

(22) PCT Filed: May 5, 2017

(86) PCT No.: PCT/FR2017/051091
§ 371 (c)(1),
(2) Date: Nov. 9, 2018

(87) PCT Pub. No.: WO2017/194864
PCT Pub. Date: Nov. 16, 2017

(65) Prior Publication Data
US 2019/0141525 A1    May 9, 2019

(30) Foreign Application Priority Data

May 9, 2016  (FR) ...................................... 1654140

(51) Int. Cl.
*H04W 12/04*    (2021.01)
*H04W 12/0431*    (2021.01)
(Continued)

(52) U.S. Cl.
CPC ..... *H04W 12/0431* (2021.01); *H04L 63/0823* (2013.01); *H04L 63/205* (2013.01);
(Continued)

(58) Field of Classification Search
CPC ... H04L 63/0823; H04L 63/205; H04L 63/20; H04W 12/04031; H04W 12/00409;
(Continued)

(56) References Cited

U.S. PATENT DOCUMENTS 7,764,945 B2 *  7/2010  Polk ................... H04L 63/0823
                                                                455/404.1
8,572,724 B2 * 10/2013  Radhakrishnan .. G06Q 20/4016
                                                                726/15
(Continued)

FOREIGN PATENT DOCUMENTS

EP           2854432 A2      4/2015

OTHER PUBLICATIONS

English Translation of the Written Opinion of the International Searching Authority dated Jun. 30, 2017 for corresponding International Application No. PCT/FR2017/051091, filed May 5, 2017.
(Continued)

*Primary Examiner* — Amare F Tabor
(74) *Attorney, Agent, or Firm* — David D. Brush; Westman, Champlin & Koehler, P.A.

(57) ABSTRACT

A method for setting up an execution rule of an operating environment for a communication terminal in a mobile network of an operator. The environment is referred to as an operator profile. The operator profile is stored in a subscriber module embedded in the terminal. According to the method, the subscriber module: obtains a first token signed by the operator and includes information relative to the identification of the rule; obtains a second token signed by a third party other than the operator and including a first element for verifying the authenticity of the first token; verifies the authenticity of the first token by using the first verification element; verifies the authenticity of the second token by using a second verification element; and sets up the rule in
(Continued)

Figure 1:
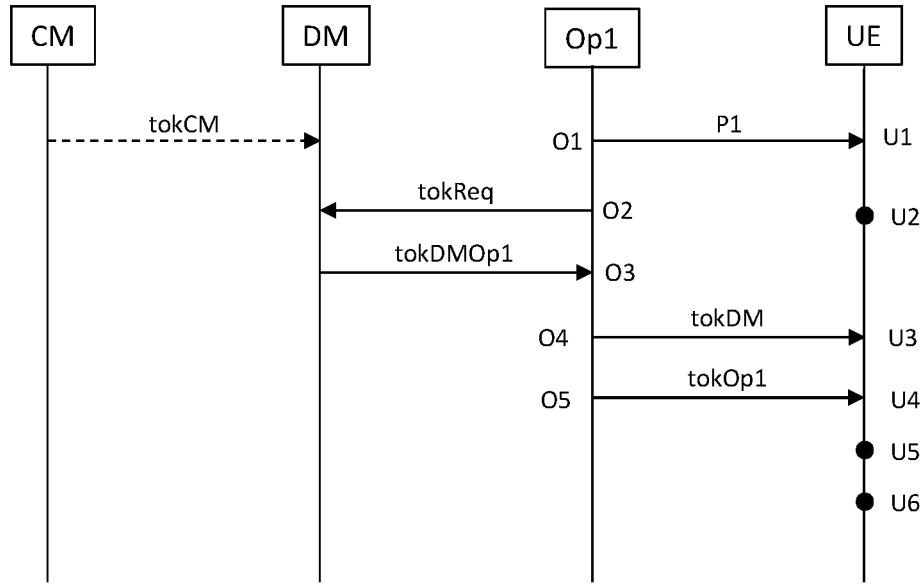

the subscriber module if the authenticity of the first and second tokens is verified.

12 Claims, 1 Drawing Sheet

(51) Int. Cl.
*H04L 29/06* (2006.01)
*H04W 8/18* (2009.01)
*H04W 12/30* (2021.01)
*H04W 12/37* (2021.01)
*H04W 12/086* (2021.01)

(52) U.S. Cl.
CPC ........... *H04W 8/183* (2013.01); *H04W 12/04* (2013.01); *H04W 12/086* (2021.01); *H04W 12/35* (2021.01); *H04W 12/37* (2021.01); H04L 63/20 (2013.01)

(58) Field of Classification Search
CPC ......... H04W 12/0027; H04W 12/0806; H04W 12/0023; H04W 12/04; H04W 8/183
USPC ........................................................ 713/156
See application file for complete search history.

(56) References Cited

U.S. PATENT DOCUMENTS

| | | | |
|---|---|---|---|
| 8,898,083 B2* | 11/2014 | Skaaksrud | H04L 9/3234 705/50 |
| 9,369,282 B2* | 6/2016 | Pal | H04L 9/3213 |
| 9,853,965 B2* | 12/2017 | Yin | H04W 12/06 |
| 9,860,324 B1* | 1/2018 | Roskind | H04L 67/141 |
| 10,515,352 B2* | 12/2019 | Brudnicki | G06F 21/34 |
| 2008/0313456 A1* | 12/2008 | Menadue | G06Q 30/06 713/156 |
| 2014/0064601 A1* | 3/2014 | Ramachandran | B25J 9/1697 382/153 |
| 2015/0110035 A1* | 4/2015 | Lee | H04L 63/205 370/329 |
| 2015/0281964 A1 | 10/2015 | Seo et al. | |

OTHER PUBLICATIONS

International Search Report dated Jun. 23, 2017 for corresponding International Application No. PCT/FR2017/051091, filed May 5, 2017.

Written Opinion of the International Searching Authority dated Jun. 23, 2017 for corresponding International Application No. PCT/FR2017/051091, filed May 5, 2017.

"Global Platform Card Specification Version 2.2", Mar. 31, 2006 (Mar. 31, 2006), XP055090891.

"Smart Cards; Embedded UICC; Requirements Specification (Release 13)", Technical Specification, European Telecommunications Standards Institute (ETSI), 650, Route Des Lucioles; F-06921 Sophia-Antipolis; France, vol. SCP Req, No. V13.1.0. Feb. 1, 2016 (Feb. 1, 2016), XP014274101.

* cited by examiner

METHOD AND DEVICE FOR THE DUAL-CONTROL SET UP OF A CONFIGURATION RULE OF AN EMBEDDED SIM CARD

CROSS-REFERENCE TO RELATED APPLICATIONS

This Application is a Section 371 National Stage Application of International Application No. PCT/FR2017/051091, filed May 5, 2017, which is incorporated by reference in its entirety and published as WO 2017/194864 A1 on Nov. 16, 2017, not in English.

1. FIELD OF THE INVENTION

The application for invention lies in the field of mobile communication terminals, and more particularly SIM cards said to be embedded (eUICC, or eSIM). An embedded SIM card allows a mobile terminal to operate with subscriptions to a plurality of operators using just one and the same SIM card, which is generally not removable.

2. PRIOR ART

An operator profile is the name given to a set of files installed within the eSIM card. The role of this set of files, if it is activated, is to ensure the execution of an operating environment of the terminal, while at the same time remaining under the control of the operator associated with the profile. This is the same environment as the one that a conventional single-operator SIM card provided by this operator would provide.

There is associated, with each operator profile, a set of policy rules that are intended to manage the life cycle of the operator profile. Some examples of rules are:
 barring deactivation of the operator profile;
 barring deletion of the operator profile;
 in the event of deactivation, then deleting the operator profile.

By analogy, in the environment provided by a conventional single-operator SIM card, there is what is called the "SIM lock" rule that the operator may choose to apply in order to prevent the terminal operating with a SIM card of a different operator. It is understood that the SIM lock module has to be integrated into the terminal and not into the SIM card. By contrast, as an eSIM card is not intended to be replaced or removed from the terminal by the user, particularly when it is soldered, the rules may be stored in the eSIM card, with the operator profiles.

When the user of the terminal with an embedded eSIM card wishes to perform an action on one of his operator profiles, for example deactivate it for a given period in order to avoid excessive billing by the associated operator, a control mechanism called policy enforcement verifies whether such an action is authorized, that is to say if it does not contravene the policy rules governing this operator profile. It is generally when the user subscribes to a subscription with an operator that the profile(s) and the associated rules are installed, on the basis of the terms of the contract between the operator and the user (or between the operator and the subscriber if the subscriber is not the user). Neither the manufacturer of the terminal nor the manufacturer of the eSIM card are involved directly in this installation of the profiles and of the rules for modifying the profiles. As only the operator is able to exert control over the profiles and over the rules, as is the case in the context of products having an eSIM card meeting the M2M (machine-to-machine) specifications defined in the GSMA (GSM association), this does not allow manufacturers for example to verify that their commercial agreements with operators are complied with, or that local laws are complied with when the manufacturer is liable.

One of the aims of the invention is to remedy these drawbacks of the prior art.

3. DISCLOSURE OF THE INVENTION

The invention aims to improve the situation by way of a method for installing a rule for executing an operating environment for a communication terminal in a mobile network of an operator, said environment being called operator profile, the operator profile being stored in a subscriber module embedded in the terminal, the method comprising the following steps implemented by the subscriber module:
 obtaining a first token signed by the operator and comprising an item of information relating to the identification of the rule;
 obtaining a second token signed by a third party other than the operator and comprising a first means for verifying the authenticity of the first token;
 verifying the authenticity of the first token by way of the first verification means;
 verifying the authenticity of the second token by way of a second verification means;
 installing the rule in the subscriber module if the authenticities of the first and second tokens are verified.

By virtue of the tokens, a policy rule is installed in the subscriber module, that is to say in the SIM or eSIM card, only if the installation is authorized both by the operator and by a third-party entity, such as other than the operator, and not just authorized by the operator associated with the profile, as is the case in the prior art. Controlling of the installation of the rule, by virtue of verification of the authenticity of the tokens, is therefore able to be undertaken jointly by the operator and by the third party, who will have entered into an agreement beforehand to produce the required authenticatable tokens. The rule forms part of a list of rules that are known to the subscriber module. The identifier of the rule allows the subscriber module to find the rule in the list and to install it.

The tokens are digital files that are transmitted to the subscriber module of the terminal on the initiative of the operator, for example at the time when the profile is installed. The tokens may be sent by an operator entity responsible for preparing the subscription management data, called SMDP ("subscription manager data preparation"), and/or by an operator platform called OTA (via radio waves, "over the air") if for example the installation of the profile and of the rules are offset in time.

Thus, the rule is installed and ready to be used in advance of a user action on the profile. Thus, if for example the profiles of two different operators are installed on the eSIM card of the terminal, the active profile being the one corresponding to a professional subscription, the inactive profile corresponding to a private subscription, the user is able to switch from his professional subscription to his private subscription at the end of his working day, without having to exchange any messages at all between his terminal and each of the operators in order to obtain authorizations to deactivate the first profile and activate the second profile. The terminal is based only on the rules that are installed by virtue of the method according to the invention, which are enough to determine and authorize all of the possible actions on the installed profiles.

It should be noted that, in this document, the term "installation" or "install", when applied to a rule, takes on the meaning given by the term "set up" in English. The installation of a rule may for example simply be activation thereof, with the knowledge that the rules, or "policy rules", form part of a list that is known between operators and manufacturers of terminals and SIM cards, and that is possibly standardized, in which they are able to be identified by an alphanumeric identifier. This list may for example be loaded into a memory of the terminal or of the subscriber card.

According to one aspect of the invention, the second verification means is installed by the third party, prior to the step of obtaining the tokens.

By virtue of this aspect, the third party controls the means for verifying the authenticity of the token that is supposed to be signed by the operator. Thus, there is dual control of the installation of the rule, by the operator by way of the first token, and by the third party by way of verification of the authenticity of the first token.

This allows greater security against possible counterfeiting of the tokens, as well as greater flexibility in the putting in place of the rules. The token associated with the third party may specifically be obtained beforehand when a contract is agreed between the operator and the third party, which contract may apply overall to a set of terminals or to terminals that are identified individually.

According to one aspect of the invention, the third party other than the operator is a manufacturer of the terminal.

By virtue of this aspect, the rule is able to be controlled jointly by the operator and by the manufacturer of the terminal. It is easy for the manufacturer to install the second verification means directly in the subscriber module "in the factory".

According to one aspect of the invention, the third party other than the operator is a manufacturer of the subscriber module of the terminal.

By virtue of this aspect, the rule is able to be controlled jointly by the operator and by the manufacturer of the subscriber module of the terminal, the latter possibly being different from the manufacturer of the terminal. It is also easy for the manufacturer of the subscriber module to install the second verification means directly in the subscriber module "in the factory" before it is delivered to the manufacturer, or to an operator if it is said operator that installs the subscriber module in the terminal.

According to one aspect of the invention, the tokens are sent by the operator.

An electronic link between the network of the operator and the terminal of the subscriber arises from the contractual link binding the operator and the subscriber. Transmission of the tokens by way of the operator is easier than by way of a third party without a contractual link to the subscriber. To guarantee joint control, it is enough for a contractual link to exist between the operator and the third party before the tokens are sent.

These tokens, which are digital files, may be sent to the subscriber module of the terminal, simultaneously or non-simultaneously, by an operator entity responsible for preparing the subscription management data, called SMDP ("subscription manager data preparation"), and/or by an operator platform called OTA (via radio waves, "over the air") if for example the installation of the profile and of the rules are offset in time.

According to one aspect of the invention, at least one token furthermore comprises information relating to limits in terms of the application of the rule to the operator profile.

By virtue of this aspect, the operator or the manufacturer, for example, are able to control the rule in a more refined manner, for example by allowing it to be used with the profile only for a given time period, or only in association with another partner operator if it involves switching from one profile to another. This makes it possible for example to avoid one of the two parties (the operator or the manufacturer) from being able to modify or add a rule beyond the duration of the agreements between the operator and the manufacturer.

According to one aspect of the invention, the first verification means is a hash resulting from a hash function applied to a key corresponding to the operator.

By virtue of this aspect, the first verification means is of small size in the second token, and is easy to implement in the subscriber module.

The various aspects of the method for installing a rule that have just been described are able to be implemented independently of one another or in combination with one another.

The invention also relates to a device for installing a rule for executing an operating environment for a communication terminal in a mobile network of an operator, said environment being called operator profile, the operator profile being stored in a subscriber module embedded in the terminal, the device comprising the following modules:

- a module for obtaining two tokens, a first token being signed by the operator and comprising an item of information relating to the identification of the rule, a second token being signed by a third party other than the operator and comprising a first means for verifying the authenticity of the first token;
- a module for verifying the authenticity of the first token by way of the first verification means, and the authenticity of the second token by way of a second verification means;
- a module for installing the rule in the subscriber module if the authenticities of the first and second tokens are verified.

This device, which is able to implement the method for installing a rule that has just been described in all of its embodiments, may for example be contained within a subscriber module such as an eSIM card, with ISD-R and policy enforcement (polEnf) modules that are modified with respect to the GSMA standards.

The invention also relates to a subscriber module of a communication terminal in a mobile network of an operator, comprising at least one operator profile module and a device such as the one that has just been described.

This subscriber module may for example be an eSIM card that is modified with respect to the GSMA standards.

The invention additionally relates to a communication terminal in a mobile network of an operator, comprising a subscriber module such as the one that has just been described.

The invention relates lastly to a computer program comprising instructions for implementing the steps of the method for installing a rule that has just been described when this program is executed by a processor.

This program may use any programming language, and be in the form of source code, object code, or of intermediate code between source code and object code, such as in a partially compiled form, or in any other desirable form.

The invention also targets an information medium able to be read by a mobile terminal and including computer program instructions, such as mentioned above.

The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

Alternatively, the information medium may be an integrated circuit in which the program is incorporated, the circuit being designed to execute or to be used in the execution of the methods in question.

4. PRESENTATION OF THE FIGURES

Figure 2:
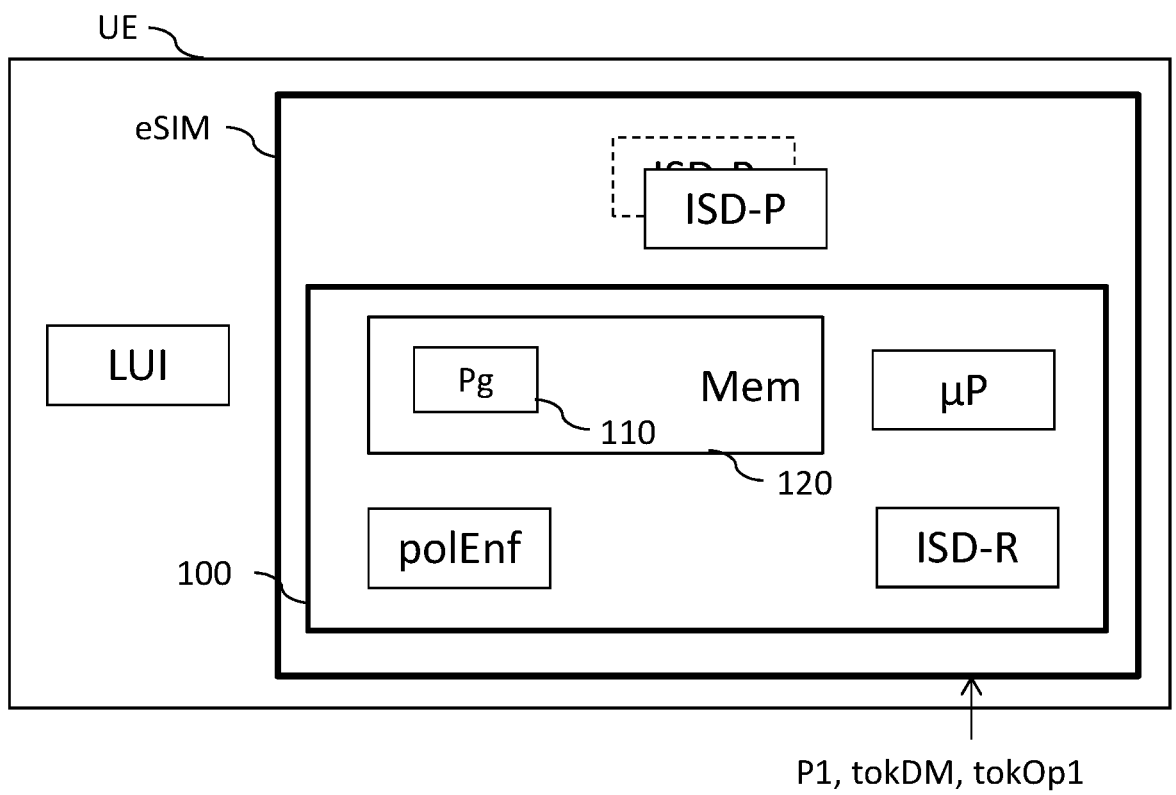

Other advantages and features of the invention will become more clearly apparent on reading the following description of particular embodiments of the invention, given by way of simple illustrative and non-limiting example, and of the appended drawings, among which:

FIG. 1 shows an exemplary implementation of the method for installing a rule, according to one aspect of the invention, FIG. 2 shows an exemplary structure of a device implementing the method for installing a rule, according to one aspect of the invention.

5. DETAILED DESCRIPTION OF AT LEAST ONE EMBODIMENT OF THE INVENTION

The remainder of the description presents examples of a plurality of embodiments of the invention applicable to an eSIM card such as is currently being standardized within the framework of the GSMA, but the invention also applies to other types of subscriber module.

Thus, the invention is illustrated by way of an example that is the deactivation of an activated profile, but the invention applies to other examples, such as the activation of a deactivated profile, the deletion of an activated or non-activated profile, etc.

FIG. 1 shows an exemplary implementation of the method for installing a rule, according to one aspect of the invention.

In a step U1, a user mobile terminal UE receives an operating environment P1 in a mobile network of an operator Op1. This operating environment, called profile, is a set of data and applications to be installed on a subscriber module and that allows services to be provided by a mobile network operator in the context of a subscription contract between this operator and the owner of the mobile terminal. The subscriber module is for example an eSIM card, the particular feature of which is that of allowing profiles of a plurality of different operators to be installed.

In a step U2, the profile P1 is installed by the terminal UE, that is to say stored in a special compartment of the eSIM card, for example the module called ISD-P (issuer security domain—profile) and responsible for instantiating, in the eSIM card, a representation of the operator, for example a device of the operator responsible for preparing the subscription management data, called SMDP.

Steps U1 and U2 are prior to the following steps, and may take on different forms, or be combined, the main result being the storage of the profile P1 in the eSIM card of the terminal UE, on the one hand, and the activation of the profile P1, on the other hand.

In a step U3, following or in advance of a desire or a request from the user to deactivate the profile P1, the terminal UE receives, from the operator Op1, a token tokDM, called "manufacturer token". As a terminal manufacturer or SIM card manufacturer does not generally have a direct relationship with the user or a communication link with his terminal UE, the token tokDM is transmitted to the terminal UE by the operator Op1, for example by the device SMDP. The way in which the operator Op1 generated or obtained the token tokDM is described further below (steps O2 to O4).

In a step U4, following or in advance of a desire or a request from the user to deactivate the profile P1, the terminal UE receives, from the operator Op1, a token tokOp1, called "operator token".

The order in which the tokens are obtained by the terminal is unimportant, and steps U3 and U4 may therefore be reversed in time.

The tokens tokDM and tokOp1 may take on the form of a message comprising a file.

The operator token tokOp1 comprises a signature of the operator Op1, an identifier of at least one rule R1 applicable to the profile P1, and optionally an identifier of the profile P1 (but not mandatorily, as verification of the signature normally makes it possible to identify P1). The operator token tokOp1 may possibly comprise one or more other fields stipulating conditions that restrict the application of the rule. Examples of such conditions are: lifetime of the rule, associated partner operator, etc.

The rule R1 forms part of a set of given rules known to the terminal, for example by way of a library of rules that are stored beforehand in the eSIM card.

The manufacturer token tokDM comprises a signature of the manufacturer DM of the terminal UE, as well as a means for verifying the authenticity of the operator token.

The means for verifying the authenticity of the manufacturer token exists in the terminal, preferably prior to the installation of the profile Op1. This means for verifying the authenticity of the manufacturer token tokDM may for example be a mechanism with public and private keys that is installed beforehand "in the factory" in a module of the eSIM card of the terminal UE by the manufacturer DM. Advantageously, this verification module may be the module polEnf of the eSIM card, called "policy enforcement" module. Specifically, this module is a neutral component in the eSIM card, with respect to all of the operators liable to install a profile on it that is associated with them.

The means for verifying the authenticity of the operator token tokOp1 is, for its part, contained in the manufacturer token. For example, this means may be a public key of the operator Op1, a certificate of the operator Op1, or a "hash" of the public key of the operator Op1. Advantageously, the module for verifying the authenticity of the operator token tokOp1 may also be the module polEnf of the eSIM card.

In a step U5, the authenticity of the tokens is verified, for example by the module polEnf of the eSIM card of the terminal UE.

The authenticity of the token tokOp1 is performed by way of the verification means contained in the token tokDM. For example, in one implementation of an authenticity verification mechanism that is easy to implement, the token tokOp1 is signed using a symmetric key that is calculated by the operator Op1, using a mechanism known under the name MAC or HMAC. This key is communicated by the operator to the module polEnf when the profile P1 is installed or activated. Lastly, the hash function to be used for the key (for example SHA256) is communicated to the module polEnf in a similar way, and the hash resulting from the application of the hash function to this key is communicated to the manufacturer DM, in the framework of an agreement entered into between the operator and the manufacturer. The token tokDM comprises the hash, that is to say the verification means, which will allow the module polEnf to verify the authenticity of the token tokOp1 by comparing the hash contained in the token tokDM with the hash obtained by applying the hash function to the key used to sign the token tokOp1, this key having been communicated beforehand to the module polEnf by the operator.

The authenticity of the token tokDM, for its part, may for example be verified by way of a signature by a private key associated with a public key known by the module polEnf to be that of the manufacturer DM.

If the authenticity of the two tokens is indeed verified, this means that the rule identified in the token tokOp1 does indeed relate to the operator identified in the token tokDM, that is to say that there is indeed a correspondence between the two tokens.

In a step U6, the rule R1 is installed, for example by the module polEnf, and is ready to be used.

In a step that is not illustrated, following the installation of the rule R1, the rule is used. For example, the terminal UE, as requested by the user, deactivates the profile P1, if this modification is authorized by the rule R1. Thus, by virtue of the installation method according to the invention, the modification is possible only if it is authorized jointly by the operator Op1 and by the manufacturer DM.

If the rule R1 is for example that an operator profile Op1 on a terminal manufactured by DM is able to be deactivated only if it is deleted completely, then the terminal UE additionally deletes the profile P1.

The invention furthermore relates to a method for the transmission, by an operator, of a token signed by the manufacturer of a mobile terminal. This method is also illustrated by FIG. 1.

In a step O1, the device SMDP of the operator Op1 sends the profile P1 to the terminal UE.

In a step O2, a device of the operator Op1, for example the device SMDP, sends a token request to a device of the manufacturer DM who manufactured the terminal UE. The request comprises at least one identifier of the operator Op1, and may comprise one or more rule identifiers and one or more profile identifiers.

In a step O3, the device of the operator Op1 receives a token tokDMOp1 in response. This token may depend on the type of control that is authorized and delegated by the manufacturer DM to the operator Op1. The token may comprise, in addition to one or more rules able to be applied to the profile, conditions that restrict the application thereof. Optionally, the token tokDMOp1 generated by the manufacturer DM may itself be based on a token tokCM generated by the manufacturer CM of the eSIM card, using a public and private key mechanism, for example.

It should be noted that step O1, which is the provision of the profile to the terminal, may take place after step O3, in which case the provision of the token of the manufacturer to the operator is in advance of a subsequent action on the profile by the user.

In a step O4, the device SMDP of the operator Op1 sends a token tokDM that is based on the token tokDMOp1. If the token request is specific to one rule and to one profile, the token tokDM may be the same as the token tokDMOp1, but, in general, the token request, as well as the response, relates to a set of rules and a set of profiles.

In a step O5, the device SMDP of the operator Op1 sends, in addition to the token tokDM, a token tokOp1 that is specific to one rule and to one profile.

With reference to FIG. 2, there is now presented an exemplary structure of a device implementing the method for installing a rule, various embodiments of which have just been described.

Such a device 100 may be implemented in the subscriber module of the terminal UE. This subscriber module may be an eSIM card that is or is not fixedly embedded, for example soldered, in the terminal.

For example, the device 100 is equipped with a microprocessor µP, and is driven by a computer program 110, stored in a memory 120 and implementing the method for installing a rule according to the invention. On initialization, the code instructions of the computer program 110 are for example loaded into a RAM memory, before being executed by the processor of the eSIM card.

Such a device 100 comprises the following hardware or software modules:
  a module ISD-R, able to obtain tokens tokOp1 and tokDM that are signed, respectively, by an operator and by a third party, and to receive one or more operator profiles P1 and to manage the installation thereof in a module ISD-P of the eSIM card;
  a module polEnf, able to verify the authenticity of the tokens tokDM and tokOp1, and to install a rule contained in one of the signed tokens in the eSIM card.

The eSIM card also comprises one or more modules ISD-P, each module ISD-P being able to host the profile of an operator for the subscriber of the terminal, and to act as a representative of this operator on the terminal.

Advantageously, the module polEnf is able to update a list of installed rules for each of the hosted profiles.

The eSIM card itself is contained in a terminal UE that furthermore comprises a module LUI (local user interface) allowing the user to act on the operator profile(s) installed on the eSIM card in the module(s) ISD-P, by way of the module ISD-R, while at the same time complying with the installed rule(s) by virtue of the installation method according to the invention.

This FIG. 2 illustrates just one specific way, from among several possible ones, of implementing the algorithm detailed above with reference to FIG. 1. Specifically, the technique of the invention is carried out indiscriminately on a reprogrammable eSIM card (a DSP processor or a microcontroller) executing a program comprising a sequence of instructions, or on a dedicated calculating machine (for example a set of logic gates such as an FPGA or an ASIC, or any other hardware module).

If the invention is implanted on a reprogrammable calculating machine, the corresponding program (that is to say the sequence of instructions) may be stored in a removable storage medium (such as for example a floppy disk, a CD-ROM or a DVD-ROM) or a non-removable storage medium, this storage medium being able to be read partly or completely by a computer or a processor.

The exemplary embodiments of the invention that have just been presented are merely a few of the conceivable embodiments. They show that the invention allows joint control, by an operator and by a third party, for example the manufacturer of the terminal or the manufacturer of the eSIM card, of any action of the user of a terminal on an operator profile that is installed or that is to be installed, and does so even if the eSIM card hosts profiles of a plurality of operators at the same time.

The invention claimed is:

1. A method for installing a rule for executing an operating environment stored in a subscriber module of a communication terminal subscribed to a mobile network of an operator, said environment being called an operator profile, the method comprising the following acts implemented by the subscriber module:
    obtaining a first digital file signed by the operator and transmitted to the subscriber module of the terminal on the initiative of the operator, termed a first token, the first token comprising an item of information relating to the identification of the rule;
    obtaining a second digital file signed by a third party other than the operator and transmitted to the subscriber module of the terminal on the initiative of the operator, termed a second token, the second token comprising a first verification element for verifying the authenticity of the first token;
    verifying the authenticity of the first token by using the first verification element;
    verifying authenticity of the second token by using a second verification element for verifying the authenticity of the second token; and
    installing the rule configured to execute the operator profile in the subscriber module in response to verifying the authenticities of the first and second tokens.

2. The control method as claimed in claim 1, wherein the second verification element is installed by the third party, prior to at least one of the steps of obtaining the tokens.

3. The control method as claimed in claim 1, wherein the third party other than the operator is a manufacturer of the terminal.

4. The control method as claimed in claim 1, wherein the third party other than the operator is a manufacturer of the subscriber module of the terminal.

5. The control method as claimed in claim 1, wherein at least one token furthermore comprises information relating to limits in terms of the application of the rule to the operator profile.

6. The control method as claimed in claim 1, wherein the first verification element is a hash resulting from a hash function applied to a key corresponding to the operator.

7. A device for installing a rule for executing an operating environment stored in a subscriber module of a communication terminal subscribed to a mobile network of an operator, said environment being called an operator profile, the device comprising:
    a processor; and
    a non-transitory computer-readable medium comprising instructions stored thereon, which when executed by the processor configure the device to perform acts comprising:
    obtaining by the subscriber module a first digital file signed by the operator and transmitted to the subscriber module of the terminal on the initiative of the operator, termed a first token, the first token comprising an item of information relating to the identification of the rule;
    obtaining by the subscriber module a second digital file signed by a third party other than the operator and transmitted to the subscriber module of the terminal on the initiative of the operator, termed a second token, the second token comprising a first verification element for verifying the authenticity of the first token;
    verifying the authenticity of the first token by using the first verification element using the subscriber module;
    verifying authenticity of the second token by using a second verification element for verifying the authenticity of the second token using the subscriber module; and
    installing the rule configured to execute the operator profile in the subscriber module in response to verifying the authenticities of the first and second tokens using the subscriber module.

8. The device according to claim 7, wherein the device is comprised in the subscriber module,
    receiving a request to deactivate or delete the operator profile from the user of the communication terminal; and
    deactivating or deleting the operator profile stored in the subscriber module in response to receiving the request.

9. A non-transitory computer-readable recording medium comprising instructions of a computer program recorded thereon, which when executed by a processor of a subscriber module configure the subscriber module to install a rule for executing an operating environment for a communication terminal in a mobile network of an operator, said environment being called an operator profile, the operator profile being stored in the subscriber module embedded in the terminal, wherein installing the rule comprises the following acts implemented by the subscriber module:
    obtaining a first digital file signed by the operator and transmitted to the subscriber module of the terminal on the initiative of the operator, termed a first token the first token comprising an item of information relating to the identification of the rule;
    obtaining a second digital file signed by a third party other than the operator and transmitted to the subscriber module of the terminal on the initiative of the operator, termed a second token, the second token comprising a first verification element for verifying the authenticity of the first token;
    verifying the authenticity of the first token by using the first verification element;
    verifying authenticity of the second token by using a second verification element for verifying the authenticity of the second token; and
    installing the rule configured to execute the operator profile in the subscriber module in response to verifying if the authenticities of the first and second tokens.

10. The method of claim 1, wherein the acts implemented by the subscriber module include.

11. The device of claim 7, wherein that acts include:
    receiving by the subscriber module a request to deactivate or delete the operator profile from the user of the communication terminal; and
    deactivating or deleting the operator profile stored in the subscriber module in response to receiving the request using the subscriber module.

12. The non-transitory computer-readable medium of claim 9, wherein the acts implemented by the subscriber module include:
    receiving a request to deactivate or delete the operator profile from the user of the communication terminal; and
    deactivating or deleting the operator profile stored in the subscriber module in response to receiving the request.

* * * * *